(12) United States Patent
Taniguchi et al.

(10) Patent No.: US 6,334,088 B1
(45) Date of Patent: Dec. 25, 2001

(54) MAP DISPLAY SYSTEM HAVING HTML INFORMATION BROWSER FUNCTION

(75) Inventors: Hisamori Taniguchi, Nagoya; Shiniohi Tsutsuki, Anjo, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/570,039

(22) Filed: May 12, 2000

(30) Foreign Application Priority Data

May 14, 1999 (JP) .................................................. 11-134103

(51) Int. Cl.[7] .............................. G01C 21/00; G08G 1/37
(52) U.S. Cl. ............................................. 701/208; 345/512
(58) Field of Search .................................. 701/208, 211; 340/995; 345/512

(56) References Cited

U.S. PATENT DOCUMENTS

| 5,757,368 | * | 5/1998 | Celi, Jr. et al. ........................ 345/507 |
| 6,101,569 | * | 8/2000 | Miyamoto et al. .................... 710/200 |
| 6,138,072 | * | 10/2000 | Nagai .................................... 701/207 |

FOREIGN PATENT DOCUMENTS

| 2-293794 | | 5/1989 | (JP) . |
| 10-300490 | | 4/1997 | (JP) . |
| 9-166450 | * | 6/1997 | (JP) . |
| 10-161534 | | 6/1998 | (JP) . |
| 11-2539 | | 1/1999 | (JP) . |

* cited by examiner

*Primary Examiner*—Michael J. Zanelli
(74) *Attorney, Agent, or Firm*—Law Office of David G. Posz

(57) ABSTRACT

In a vehicle navigation system having a navigation program, an information browser program is installed to browse generally available information. The navigation program and the browser program share a part of a plurality of image data storage areas of a RAM which are normally used to store map images in executing the navigation program. The navigation program and the browser program also share character font data and a key input processing program stored in a ROM. Thus, the number of ROMs and RAMs additionally required to perform both navigation function and browser function can be minimized.

6 Claims, 5 Drawing Sheets

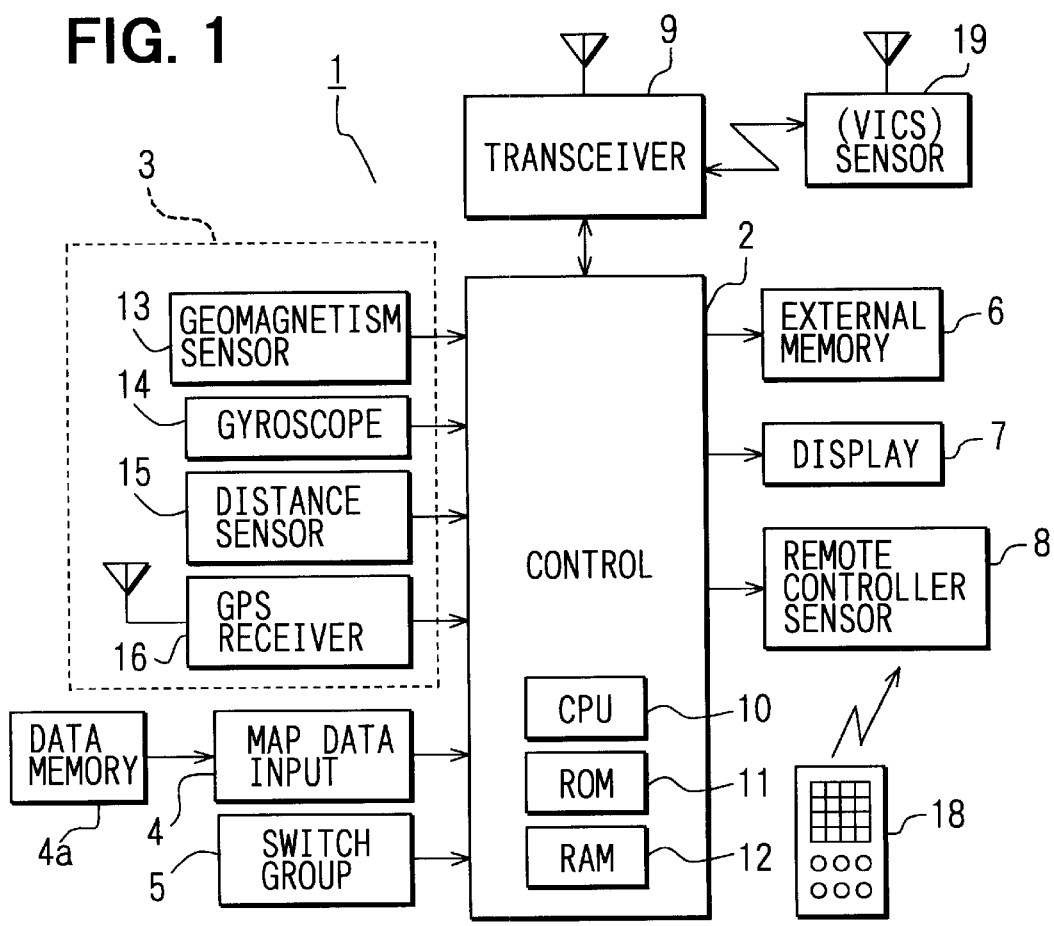
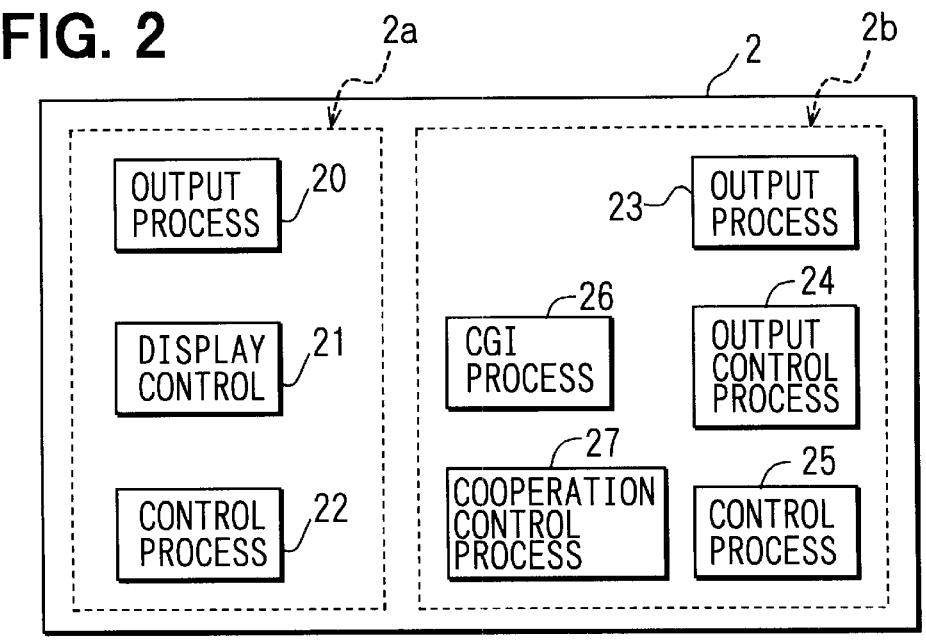

MAP DISPLAY SYSTEM HAVING HTML INFORMATION BROWSER FUNCTION

CROSS REFERENCE TO RELATED APPLICATION

This application relates to and incorporates herein by reference Japanese Patent Application No. 11-134103 filed on May 14, 1999.

BACKGROUND OF THE INVENTION

The present invention relates to a map display system, which has a display screen capable of displaying maps and the like and is used in a vehicle navigation system.

Vehicle navigation systems use display devices capable of displaying maps and the like thereon. It is recently proposed to also provide internet information (HTML: hyper text markup language) in addition to the maps for travel route guidance. The navigation system is enabled to provide the HTML information, if a browser program for reading the HTML information is installed in the navigation system.

In installing the browser program in the navigation system, it is stored in a read only memory (ROM) provided in an electronic control circuit of the navigation system. When the browser program operates, a random access memory (RAM) provided in the control circuit is used. The browser program is generally so large that the ROM and the RAM, particularly VRAM, are required to be large enough in memory size. For this reason, additional ROMs and RAMs must be provided in the control circuit, resulting in a large-sized control circuit configuration.

SUMMARY OF THE INVENTION

It is an object of the present invention to provide a map display device which is capable of providing HTML information and the like thereon without requiring too much increase in memory size.

According to the present invention, a map display system has an information browser program to browse generally available information in addition to a navigation program. The navigation program and the browser program share a part of a plurality of image data storage areas of a RAM which are normally used to store map images in executing the navigation program. The navigation program and the browser program also share character font data and a key input processing program stored in a ROM.

BRIEF DESCRIPTION OF THE DRAWINGS

Other objects, features and advantages of the present invention will become more apparent from the following detailed description made with reference to the accompanying drawings. In the drawings:

FIG. 1 is a block diagram showing a vehicle navigation system according to an embodiment of the present invention;

FIG. 2 is a diagram showing a software configuration of a control circuit shown in FIG. 1;

DETAILED DESCRIPTION OF THE PREFERRED EMBODIMENT

Figure 3A:
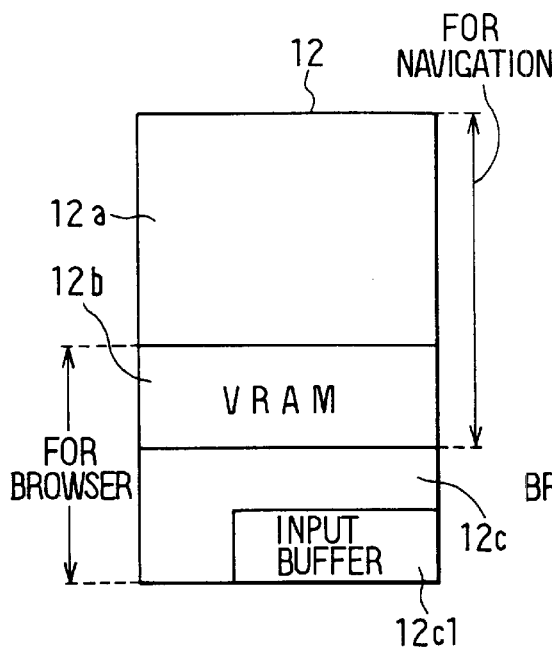
FIGS. 3A and 3B are diagrams showing storage areas of a RAM and a ROM provided in the control circuit, respectively.

Referring to FIG. 1, a vehicle navigation system 1 has an electronic control circuit 2, a position detection device 3, a map data input device 4 connected to a data memory 4a, operation switch group 5, an external memory 6, a display device 7, a remote controller sensor 8, and a radio transceiver 9. The control circuit 2 is constructed with a CPU 10, a ROM 11, a RAM 12 and the like, and is programmed to control entire operation of the navigation system 1.

The position detection device 3 includes a geomagnetism sensor 13, a gyroscope 14, a distance sensor 15 and a global positioning system (GPS) receiver 16. The position detection device 3 is constructed to detect the present position of a vehicle by using outputs of these sensors and devices. The position detection may be attained based on the outputs of a less number of sensors and devices, or based on outputs of additional sensors and devices such as steering wheel sensor or wheel sensors as known well.

The map data input device 4 may be a data reader, which retrieves map data from the data memory 4a such as a DVD-ROM, map matching data, internet (HTML) information and the like. In this embodiment, the DVD-ROM is used to store therein the map data, the HTML information and the like. A CD-ROM may be used in place of the DVD-ROM. The HTML information is generally available to a plurality of information processing devices.

The display device 7 may be a liquid crystal display panel, which has a display screen 17 (FIGS. 6 to 9) and is capable of displaying maps, characters and pictorial images thereon. The display device 7 displays on its screen 17 the road map and other additional data in a superimposed manner. The additional data include a vehicle present position mark, recommended travel path and the like.

The operation switch group 5 comprises electronic-type touch switches provided on the display screen 17, and mechanical-type push switches provided around the display screen 17. The remote controller sensor 8 is constructed as a receiver which receives signals transmitted from a remote controller 18 operable by a vehicle passenger. The transceiver 9 is constructed to transmit and receive infrastructure data. For instance, it is constructed to receive vehicle information & communication system (VICS) information through a VICS sensor 19.

The control circuit 2 is programmed to have a navigation function and HTML information reading function. The navigation function includes an automatic setting of a recommended or optimum travel path from a present position to a destination by the use of Dijkstra's algorithm, when a passenger inputs the destination through operation switch group 5 or remote controller 18. It also includes a map matching for fixing the present position on the displayed road map. The HTML information reading function includes a browser function.

Specifically, the control circuit 2 is programmed to have the operational function shown in FIG. 2. That is, the control circuit 2 has a navigation function unit 2a and a browser function unit 2b. The navigation function unit 2a includes a navigation output processing part 20, a navigation display control processing part 21 and a navigation control processing part 22. The browser function unit 2b includes a browser output processing part 23, a browser output control processing part 24, a browser control processing part 25, a CGI processing part 26 and a navigation/browser cooperation control processing part 27.

The navigation function unit 2a displays the road maps on the display screen 17 of the display device 7, executes the map matching processing, displays the vehicle present position on the displayed map, automatically sets the recommended travel route from the present position to the destination, and the like. The browser function unit 2b executes a browser function to retrieve the HTML information stored in the DVD-ROM so that the HTML information may be browsed and displayed on the display screen 17 of the display device 7.

The vehicle navigation system 1 is so constructed that the browser function (browser program) is executed in parallel or concurrently with the navigation function (navigation program) to display the HTML information on the display screen 17 of the display device 7, when the browser function operates. That is, the browser program and the navigation program are installed as multiple jobs of the system. The navigation/browser cooperation control processing part 27 operates to enable parallel or concurrent execution of the navigation program and the browser program.

The navigation program and the browser program are stored in the ROM 11 of the control circuit 2. Specifically, as shown in FIG. 3B, the navigation program is stored in storage areas 11a, 11b and 11c of the ROM 11. The storage area 11b stores therein character font data which are used when characters are displayed on the display screen 17 during execution of the navigation program. The storage area 11c stores therein a part of a key input information processing program. The storage area 11a stores therein other navigation program (map data and the like) required for the execution of the navigation program. The storage area 11d of the ROM 11 stores therein the browser program.

The browser program is so constructed to use or share the character font data stored in the storage area 11b, when the HTML information is displayed on the screen 17 of the display device 17. The browser program is also constructed to use or share the key input information processing program stored in the storage area 11c. Thus, the browser program is reduced in size and storage area 1id for the browser program is reduced, so that the number of additional ROMs required to install the browser program in the navigation system 1 may be minimized.

The RAM 12 is used as a working memory for each of the navigation program and the browser program, when both programs are executed. Storage areas 12a and 12b are used as the working memory of the navigation program. The storage area 12b is used as the VRAM (video Ram).

Figure 4:
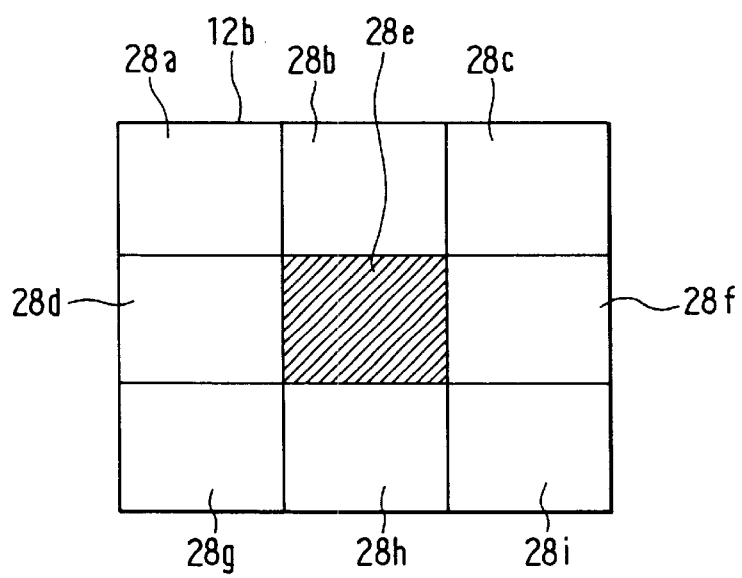
FIG. 4 is a diagram showing storage areas of a VRAM provided in the control circuit.

The VRAM stores image data for displaying images on the display screen 17. The VRAM, that is, storage area 12b, is divided into a plurality of data storage areas 28a–28i as shown in FIG. 4. Each of the storage areas 28a–28i stores the image data of one entire display screen. During the execution of the navigation program, the image data storage areas 28a–28i store nine image data corresponding to nine screen displays, as long as the browser program is not operating.

Any one of the nine images can be retrieved and displayed on the display screen 17. The image data (road map data) stored in the central storage area 28e is normally displayed on the display screen 17. The road map displayed on the screen 17 can be scrolled in any directions, that is, to the upside, downside, right side and left side to display any one of eight surrounding road map data easily and quickly.

Storage area 12c and a part of the VRAM (storage area 12b) are used as the working memory for the browser program. Specifically, four storage areas 28a–28d of the VRAM are used as the part of the VRAM during the execution of the browser program. When the browser program is operated, it stores in the storage areas 28a–28d image data for displaying the HTML information retrieved through the map data input device 4, and displays any one of the images stored in the storage areas 28a–28d. Thus, the navigation program and the browser program also share a part of the VRAM, four image storage areas 28a–28d. The number of storage areas of the RAM 12 is not limited to four, but may be less than or more than four.

Figure 5:
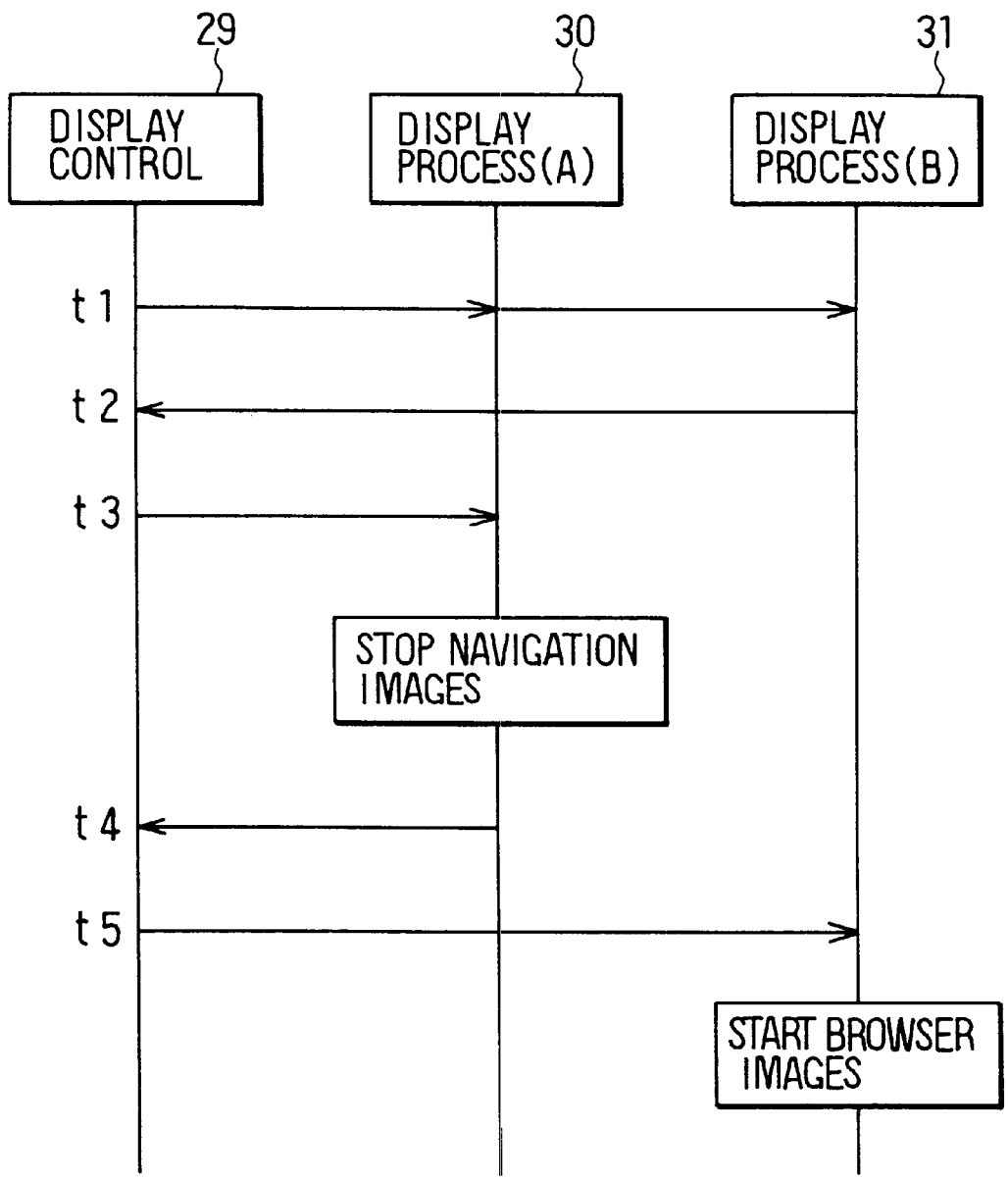
FIG. 5 is a diagram showing a sequence of display control process when a navigation program and a browser program execute processing of sharing the VRAM.
Figure 6:
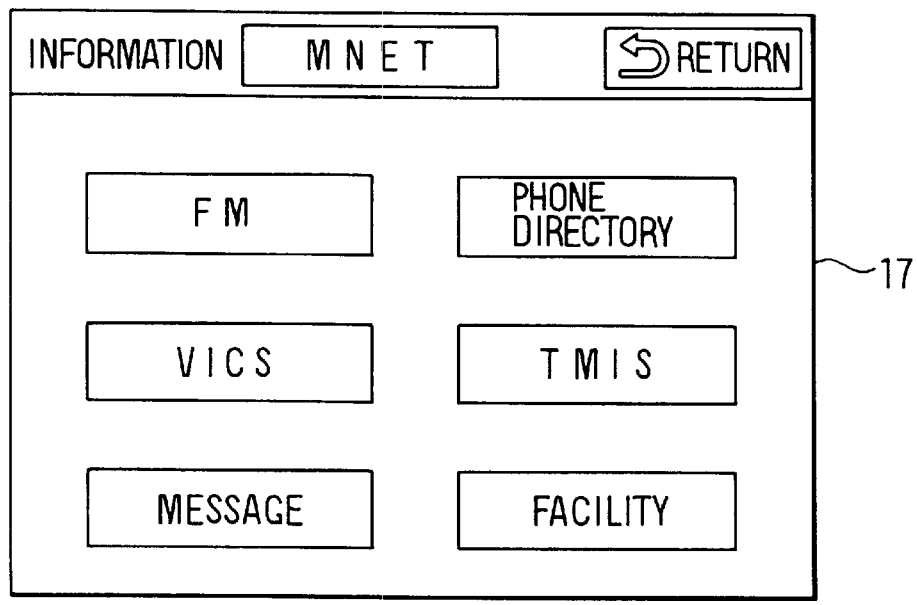
FIG. 6 is a diagram showing an example of a display screen in a navigation display mode.

The navigation program and the browser program operate to control image display while sharing the image data storage areas 28a–28d of the VRAM as shown in FIG. 5. In the figure, a display control part 29 corresponds to the navigation/browser cooperation control processing part 27. A display processing part (A) 30 corresponds to the navigation output processing part 20 and the navigation display control processing part 21. A display processing part (B) 31 corresponds to the browser output processing part 23, the browser output control processing part 24, the browser control processing part 25 and the CGI processing part 26.

It is assumed here that the display device 7 is displaying an image of navigation (road map) due to execution of the navigation program (display processing part 30), and the browser program (display processing part 31) is not in operation. It is further assumed that a request for displaying a browser image on the display screen 17 is issued from the display control part 29 to the display processing parts 30 and 31 at time t1.

The display processing part 31 issues a request to the display control part 29 at time t2 to share the VRAM, that is, four storage areas 28a–28d of the VRAM. In response, the display control part 29 issues a request to the display processing part 30 at time t3 to disable the use of four storage areas 28a–28d, which have been used for the navigation.

The display processing part 30 stops using the storage areas 28a–28d and generating and storing therein navigation display images. The display processing part 30 reports to the display control part 29 that the use of the storage areas 28a–28d for the navigation display has been disabled. The display control part 31 issues a permission to the display processing part 31 at time t5 to enable the display processing part 31 to use the storage areas 28a–28d. The display processing part 31 starts using the storage areas 28a–28d and generating and storing therein browser image data.

When the browser program is completed, the display processing part 31 stops using the storage areas 28a–28d. Then the display control part 29 enables the display processing part 30 to use the storage areas 28a–28d again for storing the navigation display images.

Figure 7:
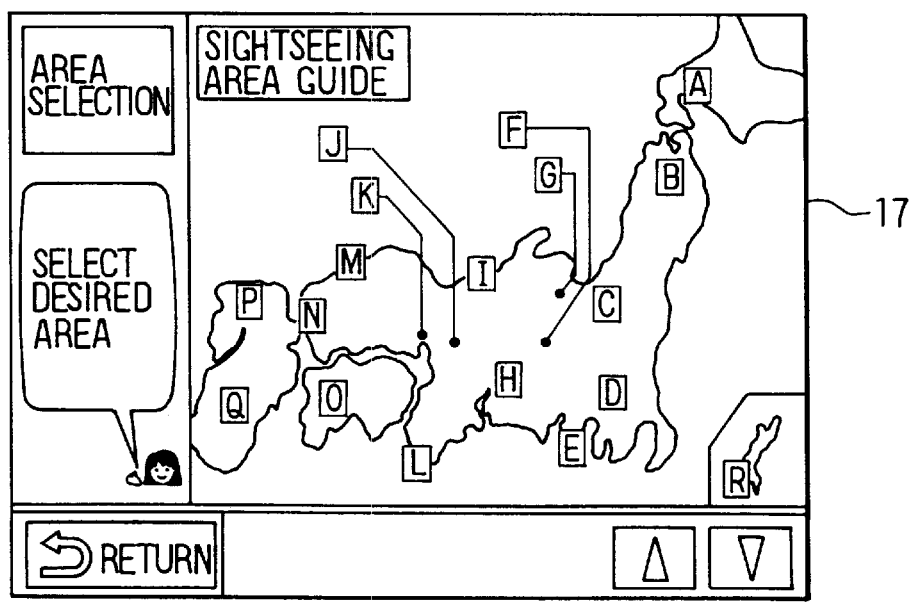
FIG. 7 is a diagram showing an example of the display screen in a browser display mode.

The display images on the display screen 17 of the display device may be changed from navigation images to browser images as shown in FIGS. 6 to 9. FIG. 5 shows an example of a menu image of the navigation display. When an operation switch on the displayed image, for instance, TMIS switch, is turned on to access the browser, the browser program is executed. A sightseeing area guide information image is displayed, for instance, as shown in FIG. 7 as the browser image display.

Figure 8:
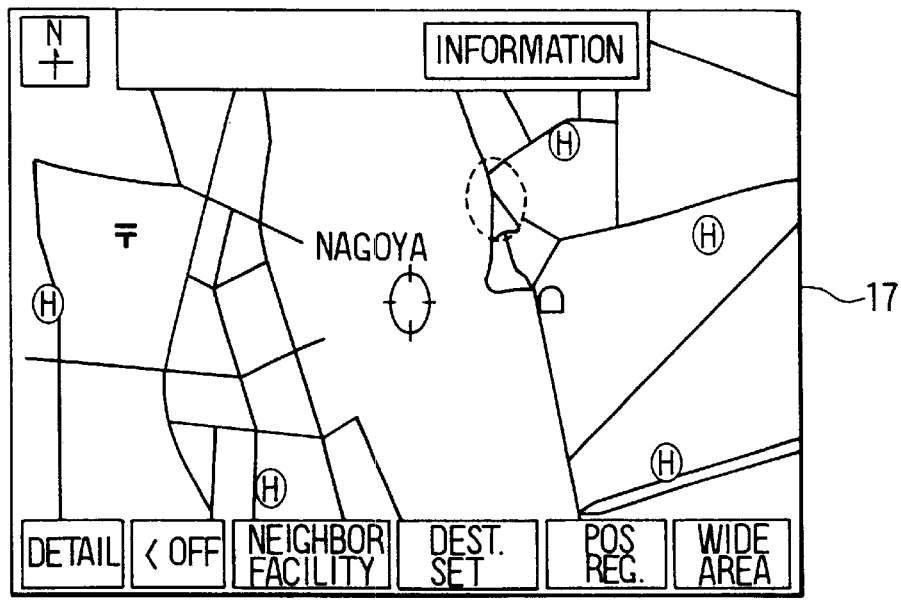
FIG. 8 is a diagram showing another example of the display screen in the navigation display mode.
Figure 9:
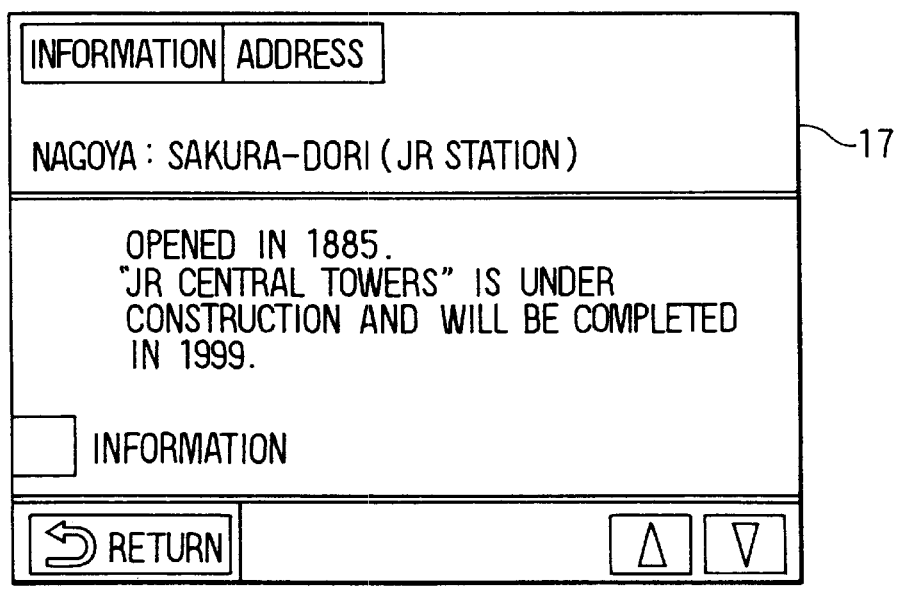
FIG. 9 is a diagram showing another example of the display screen in the browser display mode.

FIG. 8 shows an example of a map image of NAGOYA city as the navigation display. When an operation switch on the displayed map image, for instance, INFORMATION switch, is turned on, to access to the browser, the browser program is executed. Detailed information about NAGOYA station is displayed on the screen 17 as shown in FIG. 9.

Figure 3B:
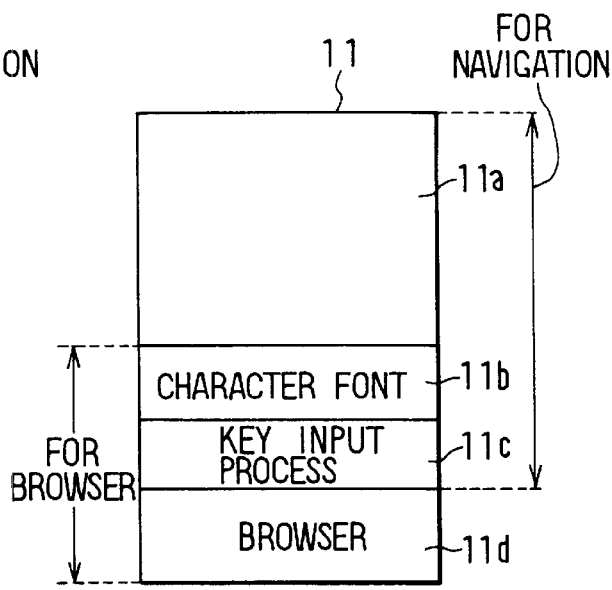

In this embodiment, as shown in FIG. 3A, a part 12c1 of the storage area 12c of the RAM 12 is used as an input buffer for the browser program. Further, the HTML information stored in the DVD-ROM and the like are limited in the number of pages and the size of images. For instance, the number of pages of the HTML information is limited to four pages at maximum, for instance, so that it corresponds to four display images of the display screen 17. The size of image of the HTML information is set at maximum to be displayed on one display area of the display screen 17. As a result, the input buffer 12c1 for the browser program can be reduced in size and the number of additional RAMs, even in the case that the browser program is operated.

In this embodiment, further, the HTML information is retrieved from the DVD-ROM through the map input device 4. As a result, a connection program for connecting to the internet is not necessitated. This is also effective to reduce the size of programs which are installed in the navigation system 1.

The present invention should not be limited to the above vehicle-mounted navigation system, but may also be applied to any portable navigation systems or map display devices having no navigation function.

What is claimed is:

1. A map display system comprising:

display means having a display screen for displaying predetermined information;

data memory means having a plurality of display image data storage areas, each storage area being for storing data of one display image to be displayed on the display screen;

map information control means for controlling storage of display data of map information in the storage areas of the data memory means and display of the stored map information on the display screen; and information browser control means for controlling storage of display data of general information in a part of the storage areas of the data memory means and display of the stored general information on the display screen, the general information being available to a plurality of information processing devices.

2. A map display system as in claim 1, wherein the general information is a HTML (hyper text markup language) information.

3. A map display system as in claim 1, further comprising:

program memory means storing a map control program for controlling a display of the stored map information on the display screen, character font data which are used in displaying characters on the display screen by the map control program, a key input processing program as a part of the map control program, an information browser program for controlling a display of the stored general information on the display screen, wherein the browser program is constructed to use the stored font data when displaying characters on the display screen, and use the key input processing program.

4. A map display system as in claim 1, further comprising:

a memory device for storing therein the general information in a reduced number of pages and a reduced size of image; and data input device for retrieving the general information from the memory device.

5. A map display system comprising:

display means having a display screen for displaying maps and images of operation keys; and memory means storing a map control program for controlling a display of map information on the display screen, character font data which is used in displaying characters on the display screen by the map control program, a key input processing program as a part of the map control program, an information browser program for controlling a display of general information on the display screen, the general information being available to a plurality of information processing devices, wherein the browser program is constructed to use the stored font data when displaying characters on the display screen, and to use the key input processing program.

6. A map display system comprising:

display means having a display screen for displaying predetermined information;

map information control means for controlling a display of maps on the display screen;

information browser control means for controlling a display of general information available to a plurality of information processing devices;

data input means for retrieving information from a memory device;

wherein the information comprises images; and wherein the memory device stores therein the general information in a reduced form with respect to the number of pages and image size.

* * * * *

UNITED STATES PATENT AND TRADEMARK OFFICE
CERTIFICATE OF CORRECTION

PATENT NO.      : 6,334,088 B1
DATED           : December 25, 2001
INVENTOR(S)     : Hisanori Taniguchi and Shinichi Tsutsuki It is certified that error appears in the above-identified patent and that said Letters Patent is hereby corrected as shown below:

<u>Title page,</u>
Item [75], Inventors, second inventor's name "Shiniohi Tsutsuki" should be
-- Shinichi Tsutsuki --

Signed and Sealed this

Ninth Day of September, 2003

JAMES E. ROGAN
*Director of the United States Patent and Trademark Office*